United States Patent Office 3,649,706
Patented Mar. 14, 1972

---

3,649,706
STEAM DEALKYLATION PROCESS
George R. Lester, Park Ridge, Ill., assignor to Universal
Oil Products Company, Des Plaines, Ill.
No Drawing. Filed June 27, 1969, Ser. No. 837,361
Int. Cl. C01b 1/18; C07c 3/58; C10g 31/14
U.S. Cl. 260—672
7 Claims

ABSTRACT OF THE DISCLOSURE

A steam dealkylation process utilizing a dual catalyst system containing catalysts comprised of alumina-alkali metal-chromia-ferric oxide-platinum, palladium, or rhodium, and capable of producing an off-gas rich in hydrogen content and low in light paraffin content.

BACKGROUND OF THE INVENTION

This invention relates to a process for dealkylating alkyl-substituted aromatics, particularly the alkylbenzenes. In particular, this invention relates to an aromatic dealkylation process wherein an aromatic is selectively dealkylated with an active catalyst system and the normally gaseous effluent is rich in hydrogen and low in light paraffinic hydrocarbon content. Specifically, this invention relates to a steam dealkylation process for converting toluene to benzene wherein the normally gaseous effluent has a high hydrogen and low methane content.

Processes for the dealkylation of alkyl-substituted aromatics have acquired significant importance within the petroleum and petrochemical industries. In particular, the demand for benzene, a basic building block in the field of organic chemistry, often exceeds its naturally occurring supply, thus necessitating the dealkylation of the more readily available alkyl-substituted benzenes as a source of benzene. For example, benzene is in demand as a basic starting material in the manufacture of styrene, phenol, alkylsulfonate detergents, nylon, etc. This demand is met, in part, by the dealkylation of alkylbenzenes, particularly toluene. Other alkylbenzenes such as xylenes are also convertable to benzene, but they have in recent years acquired greater value than benzene itself, and thus it is presently economically impractical to submit these aromatics to dealkylation to produce benzene.

In addition there exists a demand for naphthalene as an intermediate in the production of phthalic anhydride. Since naphthalene exists in rather small quantities in petroleum, it is desirable to dealkylate the more prevalent and available alkylnaphthalenes such as, methylnaphthalene to form naphthalene.

Several processes are available both catalytic and noncatalytic, for the dealkylation of alkylaromatic hydrocarbons such as toluene. In general, catalytic reactions are preferred since the presence of the catalyst requires less severe reaction conditions . . . i.e. lower reaction temperatures and lower reaction times . . . than otherwise available in the absence of a catalyst. These processes generally use hydrogen or steam as a source of hydrogen for the reaction involved, namely the cleavage of an alkyl group from the aromatic nucleus. Steam is particularly preferred because it is readily available and inexpensive, and yields, on reaction, valuable hydrogen as a by-product. In other words, when using steam instead of hydrogen in a dealkylation reaction, hydrogen is produced rather than consumed. In these steam dealkylation processes, however, a normally gaseous effluent . . . i.e. off-gases present after the reactor effluent has been condensed and cooled . . . often contains, in addition to hydrogen, carbon dioxide, carbon monoxide, methane, ethane, etc. The hydrogen is readily separable from the carbon dioxide and carbon monoxide but is not readily separable from the light paraffins, such as methane, without resort to intricate methods such as cryogenic separations. This methane content is undesirable when relatively pure hydrogen is required for use in other processes. Often this hydrocarbon content is so high as to render the off-gas suitable only for fuel purposes. Thus, it is desirous in the art that this normally gaseous effluent have a high hydrogen content and a low methane content so that the hydrogen may be readily recovered and utilized in subsequent refining and petrochemical processes.

SUMMARY OF THE INVENTION

Accordingly, it is an object of this invention to develop a catalytic steam dealkylation process for the dealkylation of alkylaromatics, wherein the normally gaseous effluent is rich in hydrogen and low in light paraffinic hydrocarbon content. In particular, it is an object of this invention to develop a catalytic steam dealkylation process for converting toluene to benzene, wherein the normally gaseous effluent is mainly hydrogen and carbon dioxide, and is low in methane content.

Catalytic composites of alumina having combined therewith ferric oxide, alkali metal, chromia, and a platinum, palladium, or rhodium component are effective steam dealkylation catalysts. Other noble metals are substantially ineffective in this type composite. However, platinum and palladium, while imparting the desired activity and selectivity, do so at substantially higher temperatures (about 100° C.) than does rhodium and these catalysts are not as stable as the rhodium containing catalysts. Thus, rhodium is a particularly preferred component although platinum or palladium components are within the scope of this invention.

In these catalysts, the inclusion of the ferric oxide component substantially increases the selectivity of the catalyst over that obtained in its absence, particularly for the dealkylation of toluene. However, the inclusion of this component to acquire selectivity also reduces the activity of the catalyst so that a balance must be made in the iron oxide content to obtain the most advantageous catalyst. The most advantageous selective-active catalyst contains from about 0.2 to about 2.0 wt. percent ferric oxide. This catalyst unfortunately produces a normally gaseous effluent containing substantial amounts of methane. By raising the ferric oxide content, however, this normally gaseous effluent contains a negligible amount of methane. Particularly effective are catalysts containing from about 5 to about 20 wt. percent ferric oxide but as hereinbefore stated, these catalysts are less active than those containing lesser amounts of ferric oxide. By combining these different catalysts in a catalytic system of the type hereinafter described, a dealkylation process is available with the activity and selectivity attributes of the lower ferric oxide content catalyst while obtaining the lower methane content off-gas associated with the higher ferric oxide content catalyst.

Therefore, in an embodiment, this invention relates to a process for the dealkylation of an alkylaromatic hydrocarbon which comprises contacting said hydrocarbon, in admixture with steam, at a steam to hydrocarbon mole ratio of about 1:1 to about 30:1, at dealkylation conditions, with a dealkylation catalytic system comprising from about 50 wt. percent to about 90 wt. percent of a catalytic composite comprising alumina having from about 0.1 to about 4 wt. percent alkali metal, from about 0.2 to about 2.0 wt. percent $Fe_2O_3$, from about 0.05 to about 5.0 wt. percent platinum, palladium, or rhodium, and from about 1.0 to about 60 wt. percent chromia composited therewith, and from about 10 wt. percent to about 50 wt. percent of a catalytic composite comprising alumina having from about 0.1 to about 4 wt. percent alkali metal, from about 5 to about 20 wt. percent $Fe_2O_3$, from about 0.05 to about 5 wt. percent platinum, palladium, or rhodium, and from about 1.0 to about 60 wt. percent chromia composited therewith.

In more limited embodiments, the dealkylation system of the foregoing process can comprise either a physical mixture of said catalytic composites or separate catalytic zones with the alkylaromatic being first contacted with the 0.2 to 2.0 wt. percent $Fe_2O_3$ catalytic composite.

Other objects and embodiments referring to more particular catalysts and conditions will be found in the following more detailed description of this invention.

DESCRIPTION OF PREFERRED EMBODIMENTS

The process of this invention is adapted to the dealkylation of alkylaromatic hydrocarbons, particularly the alkylbenzenes such as toluene, the xylenes, the trimethylbenzenes, ethylbenzenes, n-propylbenzenes, cumene, t-butylbenzene, n-butylbenzene, etc. Particularly preferred is toluene. It is also within the scope of this invention to dealkylate the lower molecular weight polycyclic alkylaromatics such as the methylnaphthalenes, ethylnaphthalenes, methylanthracenes, ethylanthracenes, etc., including those aromatics having larger alkyl groups than these here enumerated. It is to be further understood that by varying the hereinafter described reaction conditions within the limitations set forth, the various alkylaromatic hydrocarbons may be partially or completely dealkylated. For example, mesitylene can be converted to meta-xylene, toluene, and/or benzene, or p-tertiary-butyltoluene can be converted to tertiary-butylbenzene, p-propyltoluene, isopropylbenzene, p-ethyltoluene, ethylbenzene, and paraxylene. It is also within the scope of this invention to dealkylate any mixture of the foregoing alkylaromatic hydrocarbons as well as a single species thereof, and the alkylaromatic to be alkylated may be present in admixture with hydrocarbons or inerts as typically found in refinery streams. It is to be understood that the aforementioned compounds are only representative of the class of alkylaromatic hydrocarbon which may be used in the process of this invention and do not represent compounds to which this process may be limited.

The alumina component of the catalyst utilized in the process of this invention is a high surface area alumina characterized by a surface area of at least 50 $m.^2/gm.$ and preferably an area of about 100 to about 300 $m.^2/gm.$ The alumina is suitably prepared by the conventional methods well known to the art. For example, an alkaline reagent, usually ammonium hydroxide, is added to an aqueous solution of an aluminum salt such as aluminum chloride whereby aluminum hydroxide is precipitated from the solution. Upon washing, drying and calcining at a temperature of about 500 to about 700° C., the aluminum hydroxide is converted to the desired alumina.

The other components of this catalyst can be added to the alumina in any desired order. The chromia component may be subsequently impregnated on the alumina as hereinafter described or it may be co-precipitated with the alumina to form a homogenous composite therewith. For example, an alkaline reagent such as ammonium hydroxide is added to an aqueous solution of aluminum chloride and chromium nitrate whereby a co-precipitate is formed which, upon washing, drying and calcining, yields a chromia-alumina composite.

The alumina or chromia-alumina thus prepared may be formed into particles of uniform size and shape such as by commingling a pelleting agent such as hydrogenated vegetable oil, graphite, polyvinyl amine, etc., with the alumina or chromia-alumina in a powdered form, then compressing the mixture into pellets.

A preferred method of preparing the alumina relates to the preparation of alumina spheres and comprises digesting aluminum in aqueous aluminum chloride and/or hydrochloric acid. It is then possible to manufacture the alumina spheres by dispersing the resultant sol in the form of droplets into an oil bath maintained at an elevated temperature thereby effecting gellation of the droplets. The resultant spherical particles are retained in the oil bath until they set into firm gel spheres. The spheres are thereafter recovered and subjected to specific aging procedures under alkaline conditions to impart desired volume characteristics thereto. This method is as substantially described in U.S. Pat. 2,620,314, issued to James Hoekstra. Again, the chromia component may be composited with the alumina in a spherical shape by substantially the same method. Thus, the aluminum may be digested in aqueous chromium chloride instead of aluminum chloride, in the presence or absence of hydrochloric acid. The resulting sol may then be further treated in substantially the same manner and at the same conditions as hereinbefore described to give a spherical composite of chromina and alumina in the desired proportions.

In another preferred manner of preparation, a chromia sol is prepared and mixed with an alumina sol with the resultant mixed sol being treated as before. The chromia sol may be prepared, for example, by dissolving chromic oxide ($CrO_3$) in dilute hydrochloric acid followed by the reduction of the $Cr(+6)$ to $Cr(+3)$ with formaldehyde or other suitable reductants.

Generally, the chromia is impregnated on the alumina, either alone or in combination with one or more of the other catalyst components such as for example, by suspending, dripping, or otherwise immersing the alumina in an aqueous solution containing a suitable chromium compound, such as chromium nitrate, chromic acid, etc., which is decomposable to chromia upon subsequent calcination. The alumina is immersed in the impregnating solution for a suitable time during which the excess water is evaporated therefrom, or after which the excess solution is decanted therefrom. The foregoing procedure may be repeated one or more times with or without intermediate drying to achieve the desired catalyst composition. In any case, the concentration of the impregnating solution should be such as to insure a final catalyst composite containing from about 1.0 to about 60 wt. percent chromia, and, more preferably, from about 5 to about 15 wt. percent.

The alkali metal component is suitably added to the catalyst composite by treating the alumina or chromia-alumina, as the case may be, with an alkali metal hydroxide or an alkali metal salt such as lithium hydroxide, lithium nitrate, potassium hydroxide, potassium nitrate, sodium hydroxide, sodium nitrate, etc., in an aqueous solution and thereafter calcining the resultant composite at from about 500 to about 700° C. whereby said hydroxide or salt is thoroughly decomposed. Basic alkaline earth compounds are also applicable. These foregoing basic components are added to the catalyst to inhibit some of the cracking capabilities of the catalyst so as to avoid aromatic ring loss. It is preferred that these components be present in an amount to provide a final composite containing on an elemental basis about 0.1 to about 4 wt. percent alkali metal. Particularly preferred is potassium.

The iron component may be added to the catalyst composite in a separate step or together with one or more of the other components by the impregnating technique hereinbefore described. Thus, a soluble iron compound may be prepared in an aqueous solution with or without a soluble compound of one or more of the other catalyst components and the resulting solution utilized to treat the alumina, or alumina composited with one or more of the other components. The iron concentration of the impregnating solution should be such as to insure a finished catalyst composite containing the desired amount of $Fe_2O_3$, namely one catalyst containing from about 0.2 to about 2.0 wt. percent $Fe_2O_3$ and another catalyst containing from about 5 to about 20 wt. percent $Fe_2O_3$ as calculated on an oxide basis. Suitable iron compounds include ferrous chloride, ferric chloride, ferrous sulfate, ferric nitrate, etc. While iron has a deactivating influence as hereinbefore described, conversion can be maintained at any desired level by utilizing more severe reaction conditions within the ranges hereinafter set forth without substantially impairing the improved selectivity resulting from the inclusion of iron in a catalyst composition.

It has been found to be particularly advantageous to steam-treat the alumina component of the catalyst, preferably prior to the addition of the platinum, palladium, or rhodium component thereto. This steam treatment is suitably accomplished by passing a steam-air mixture in contact with the alumina for a period from about 1 to about 24 hours at a temperature from about 500° to 700° C. This treatment tends to improve both the activity and stability of the finished catalyst.

The desired platinum, palladium, or rhodium composition may then be obtained by treating the composite with a platinum, palladium, or rhodium salt such as a chloride, nitrate, etc., in an aqueous solution sufficient to yield a finished catalyst composite containing from about 0.05 to about 5.0 wt. percent platinum, palladium, or rhodium as calculated on an elemental basis. Particularly preferred are composites containing from about 0.3 to about 1.5 wt. percent platinum, palladium, or rhodium. As hereinbefore described, rhodium is the particularly preferred component of this catalyst since platinum and palladium while imparting the desired activity and selectivity do such only at substantially higher temperatures than does rhodium, and these catalysts are not as stable as the corresponding rhodium catalyst.

The process of this invention may be effected in either a batch or continuous manner. The preferred method of operation is a continuous-flow process wherein the catalyst is contained in a fixed bed. Since the high hydrogen content off-gas obtained when utilizing the high ferric oxide catalyst results from a reaction between the evolved light hydrocarbons, such as methane, and steam as catalyzed by the high iron content, it is preferred that the majority of this high iron content catalyst be in the latter portion of the fixed catalyst bed. This enables the methane evolved during the dealkylation reaction involving the low iron content, more active dealkylation catalyst to be converted to hydrogen. This can be most efficiently and effectively accomplished by first passing the alkylaromatic, in admixture with steam, over a bed of the low iron content catalyst and then passing the resultant reaction mixture over a bed of the high iron content catalyst. It is preferred that each of these catalyst beds be contained in a single reactor system, but it is within the scope of this invention to have each bed in separate reactors. Since it is preferred to effect the reaction in a downflow manner, the high iron content catalyst is first placed in the bottom portion of the reactor in an amount such as to give the desired amount of catalyst, namely about 10 to about 50 wt. percent of the total catalyst within the system. The low iron content catalyst is then placed over the high iron content catalyst. It is also within the scope of this invention for the two different catalysts to be a physical mixture of the two catalysts. This can be accomplished by physically blending the catalysts in the desired proportions necessary to provide a total catalyst system containing from about 10 to about 50 wt. percent of the high iron content catalyst and from about 50 to about 90 wt. percent by the low iron content catalyst. This physical mixture can be such that the concentration of each catalyst is uniform over the entire catalyst bed but, as hereinbefore stated, it is desirous to have the majority of the high iron content catalyst near the effluent end of the catalytic bed. Thus, a logarithmic type dilution having a high iron content near the bed exit is particularly prefrred. The catalyst bed may also contain alternate layers or strata of the two different catalysts. These physical mixtures are possible since the iron will migrate from particle to particle and each catalyst will retain its individual identity and function.

It is to be emphasized that the purpose of this dual catalyst technique is to provide a process utilizing the activity and selectively attributes of the low iron content catalyst while being able to provide a gaseous effluent high in hydrogen content. This can be obtained by using the system hereindescribed containing about 50 to about 90 wt. percent low iron content catalyst and 10 to about 50 wt. percent high iron content catalyst. This type system provides an overall process with alkylaromatic conversion and selectivities essentially equal to that obtainable when utilizing the low iron content catalyst alone while having an effluent gas much richer in hydrogen than obtainable with such catalyst is utilized alone.

The preferred method of effecting the process of this invention is to commingle steam with the alkylaromatic charge stock in a mole ratio of about 1:1 to about 30:1 or more. This mixture is then preheated to the desired dealkylation reaction temperature of about 300° C. to about 700° C. and passed to a reactor or reactors containing the aforedescribed catalyst bed. The steam-aromatic mixture is charged to this reactor at a hydrocarbon liquid hourly space velocity (LHSV), i.e. volume of hydrocarbon charged per hour per volume of total catalyst ... of about 0.5 to about 10 with an LHSV of about 0.5 to about 2.0 being preferred. The products of the dealkylation reaction are conveniently recovered by passing the hot reactor effluent to a condenser-separator system whereby the normally liquid components are condensed to form an upper hydrocarbon layer and a lower water layer with the non-condensable off-gases containing hydrogen, carbon dioxide, carbon monoxide, and trace amounts of methane, ethane, etc., being discharged overhead. The hydrocarbon layer is continuously separated, dried and fractionated to recover the desired product, and unconverted feed for recycle. The off-gases are passed to a suitable scrubber such as those utilizing monoethanolamine potassium carbonate, or N-methyl-2 pyrrolidone as a sorbent to remove the carbon oxides. The resulting substantially carbon oxide-free gas produced by this invention then preferably contains at least 95% by volume hydrogen.

EXAMPLES

The following examples are given to illustrate the process of this invention and the benefits to be afforded through its use. However, these examples are not necessarily presented for purposes of limiting the scope of this invention but in order to further illustrate the embodiments of the present process.

EXAMPLE I

A catalytic composite containing about 0.9% rhodium, 10% chromia, 2% potassium oxide and 1.0% $Fe_2O_3$ in an alumina support was prepared by treating a previously calcined alumina support with a mixture containing 40 mole percent water and 60 mole percent air at a temperature of 600° C. for a period of 12 hours. 36.1 gms. of this steam-treated alumina was then slurried in an aqueous solution containing 5.6 gms. of chromia, and 2.0 gms. of $Fe(NO_3)_3 \cdot 9H_2O$. The resultant slurry was evaporated to dryness, further dried at 250° C. and calcined at 650° C. An aqueous solution containing 1.8 gms. of potassium nitrate and 0.91 gms. of $RhCl_3 \cdot 3H_2O$ was utilized to impregnate the calcined particles which were thereafter dried and further calcined at 550° C. for 2 hours.

In like manner, a catalytic composite containing about 0.9% rhodium, 10% chromia, 2% potassium oxide, and 10% ferric oxide in an alumina support was prepared.

About 50 gms. of the 1.0% ferric oxide catalytic composite in a 40 to 60 mesh size range was placed in a fixed-bed vertical tubular reactor and reduced with hydrogen at 570° C. Thereafter, steam and toluene in a steam to toluene mole ratio of 20:1 and a toluene liquid hourly space velocity of about 1.0 were charged to the reactor. The reactor was maintained at a temperature of 440° C. and a pressure of 250 p.s.i.g. The toluene-steam charge was passed downward through the catalyst bed and the reactor effluent collected in a condenser. The total conversion of toluene to benzene was 50.4% with a benzene selectivity of 94.9%. The liquid product contained 44.9 wt. percent benzene and 55.1 wt. percent toluene as determined by gas liquid chromatography. The gaseous effluent analyzed as 68.3 mole percent hydrogen, 7.6 mole percent methane, and 24.1 mole percent carbon dioxide, or, in other words, 90.0 mole percent hydrogen and 10.0 mole percent methane on a carbon oxide-free basis.

EXAMPLE II

About 50 gms. of the 10% ferric oxide catalytic composite in a 40–60 mesh size range was placed in a fixed bed vertical tubular reactor and reduced with hydrogen at 570° C. Thereafter, steam and toluene in a steam to toluene mole ratio of 20:1 and a toluene liquid hourly space velocity of about 1.0 where charged to the reactor. The reactor was maintained at a temperature of 440° C. and a pressure of 250 p.s.i.g. These are the same conditions as utilized in Example I when utilizing the low iron content catalytic composite. The toluene steam charge was passed downward to the catalyst bed and the reactor effluent collected in a condenser. The total conversion of toluene to benzene was 37.5% with a benzene selectivity of 96.3%. The liquid product contained 32.1 wt. percent benzene and 67.9 wt. percent toluene as determined by gas-liquid chromatography. The gaseous effluent analyzed as 69.8 mole percent hydrogen, 1.9 mole percent methane, and 28.3 mole percent carbon dioxide, or, in other words, 97.4 mole percent hydrogen and 2.6 mole percent methane on a carbon oxide-free basis. These results indicate the high iron content catalyst to be as selective but not as active as the low iron content catalyst but that the gaseous effluent is much richer in hydrogen than that obtained when utilizing the low iron content catalyst.

EXAMPLE III

About 10 gms. of the high iron content catalytic composite prepared in Example I is placed in a fixed-bed vertical tubular reactor. Over this catalyst is placed about 40 gms. of the low iron content catalytic composite utilized in Example I. These catalysts are then reduced with hydrogen at 570° C. Thereafter, steam and toluene in a 20:1 steam to toluene mole ratio and a toluene liquid hourly space velocity of about 1.0 based on the total catalyst charge is charged to the reactor. The reactor temperature is maintained, as in Example I, at 440° C. and a pressure of 250 p.s.i.g. The toluene-steam charge is passed downwardly through the catalyst bed and the reactor effluent collected in a condenser. The total conversion of toluene to benzene is 48.0% with a selectivity of about 95.9%. The liquid product contained 42.7 wt. percent benzene and 57.3 wt. percent toluene as determined by gas-liquid chromatography. The gaseous product contains 69.4 mole percent hydrogen, 2.2 mole percent methane, and 28.4 mole percent carbon dioxide, or, in other words, 96.9 mole percent hydrogen and 3.1 mole percent methane on a carbon oxide-free basis.

From the foregoing examples, the beneficial import of the process of this invention is readily apparent to those trained in the art. By utilizing the described dual catalyst concept, a gaseous effluent rich in hydrogen content is available from a process using an active, selective low iron content catalyst containing rhodium, alumina, iron oxide, potassium oxide, and chromia. This is attained by combining this catalyst with 20 wt. percent of a similar catalytic composite having a high iron content. The conversions and selectivities obtained are essentially equivalent to those obtained when utilizing the low iron content catalyst as a single catalyst component at the same reaction conditions. However, the off-gas hydrogen content is greatly increased over that obtained when utilizing this low iron content catalyst by itself. This attribute is available only when using such dual catalyst systems since by increasing the iron content over 2.0 wt. percent, high hydrogen purities are available but equivalent conversions, as compared to low iron content catalysts, can be obtained only by utilizing more severe reaction conditions.

I claim as my invention:

1. A process for the dealkylation of an alkylaromatic hydrocarbon which comprises contacting said hydrocarbon, in admixture with steam, at a steam to hydrocarbon mole ratio of about 1:1 to about 30:1, at dealkylation conditions, with a dealkylation catalyst system comprising from about 50 wt. percent to about 90 wt. percent of a first catalytic composite comprising alumina having from about 0.1 to about 4 wt. percent alkali metal, from about 0.2 to about 2.0 wt. percent $Fe_2O_3$, from about 0.05 to about 5.0 wt. percent platinum, palladium or rhodium and from about 1.0 to about 60 wt. percent chromia composited therewith, and from about 10 wt. percent to about 50 wt. percent of a second catalytic composite comprising alumina having from about 0.1 to about 4 wt. percent alkali metal, from about 5 to about 20 wt. percent $Fe_2O_3$, from about 0.05 to about 5 wt. percent platinum, palladium, or rhodium, and from about 1.0 to about 60 wt. percent chromia composited therewith.

2. The process of claim 1 further characterized in that said dealkylation catalytic system comprises a physical mixture of said first and second catalytic composites.

3. The process of claim 1 further characterized in that dealkylation catalytic system comprises separate catalytic zones with the alkylaromatic first being contacted with the 0.2 to 2.0 wt. percent $Fe_2O_3$ catalytic composite.

4. The process of claim 1 further characterized in that said dealkylation conditions include a temperature of about 300° C. to about 700° C. and a pressure of about atmospheric to about 100 atmospheres.

5. The process of claim 1 further characterized in that said alkali metal is potassium.

6. The process of claim 1 further characterized in that alkylaromatic hydrocarbon is an alkylbenzene.

7. The process of claim 6 further characterized in that said alkylbenzene is toluene.

References Cited

UNITED STATES PATENTS

| | | | |
|---|---|---|---|
| 3,222,132 | 12/1965 | Dowden | 23—212 |
| 3,306,944 | 2/1967 | Pollitzer | 260—672 |
| 3,436,433 | 4/1969 | Lester | 260—627 |
| 3,436,434 | 4/1969 | Lester | 260—672 |

DELBERT E. GANTZ, Primary Examiner

G. E. SCHMITKONS, Assistant Examiner

U.S. Cl. X.R.

23—212 A; 208—49, 74; 252—465